United States Patent

[11] 3,625,269

[72] Inventor Leif A. Holan
Winona, Minn.
[21] Appl. No. 823,370
[22] Filed May 9, 1969
[45] Patented Dec. 7, 1971
[73] Assignees Leif A. Holan;
William Wernz; Rudolph Miesbauer,
Winona, Minn.

[54] WOODWORKING MACHINE
4 Claims, 21 Drawing Figs.
[52] U.S. Cl................................................. 144/136 R,
144/133 R, 144/7, 143/38 R
[51] Int. Cl..................................................... B27f 1/02
[50] Field of Search......................................... 144/136, 7,
133, 3–11, 2–3; 143/38, 6

[56] References Cited
UNITED STATES PATENTS
1,394,593 10/1921 Wetmore....................... 144/7
1,740,555 12/1929 Warmoth....................... 144/133
3,331,413 7/1967 Hoffman....................... 144/136

Primary Examiner—Donald R. Schran
Attorney—Merchant & Gould

ABSTRACT: A frame having a plurality of cutting heads mounted thereon, two of the cutting heads including a pair of rotary saws mounted in planes lying at approximately 90° to each other and intersecting along a line through the panel being cut at a position spaced a predetermined distance from the outer planar surface of the panel so as to form grooves for two plain miter joints, and two cutting heads mounted to coincide with either edge of the panel each including a router and a circular saw for forming grooves for rabbet joints and trimming the outer edges, whereby the entire panel can be formed into three sides of a cabinet for TV, speakers, or the like.

PATENTED DEC 7 1971

INVENTOR.
LEIF A. HOLAN
BY
Merchant & Gould
ATTORNEYS

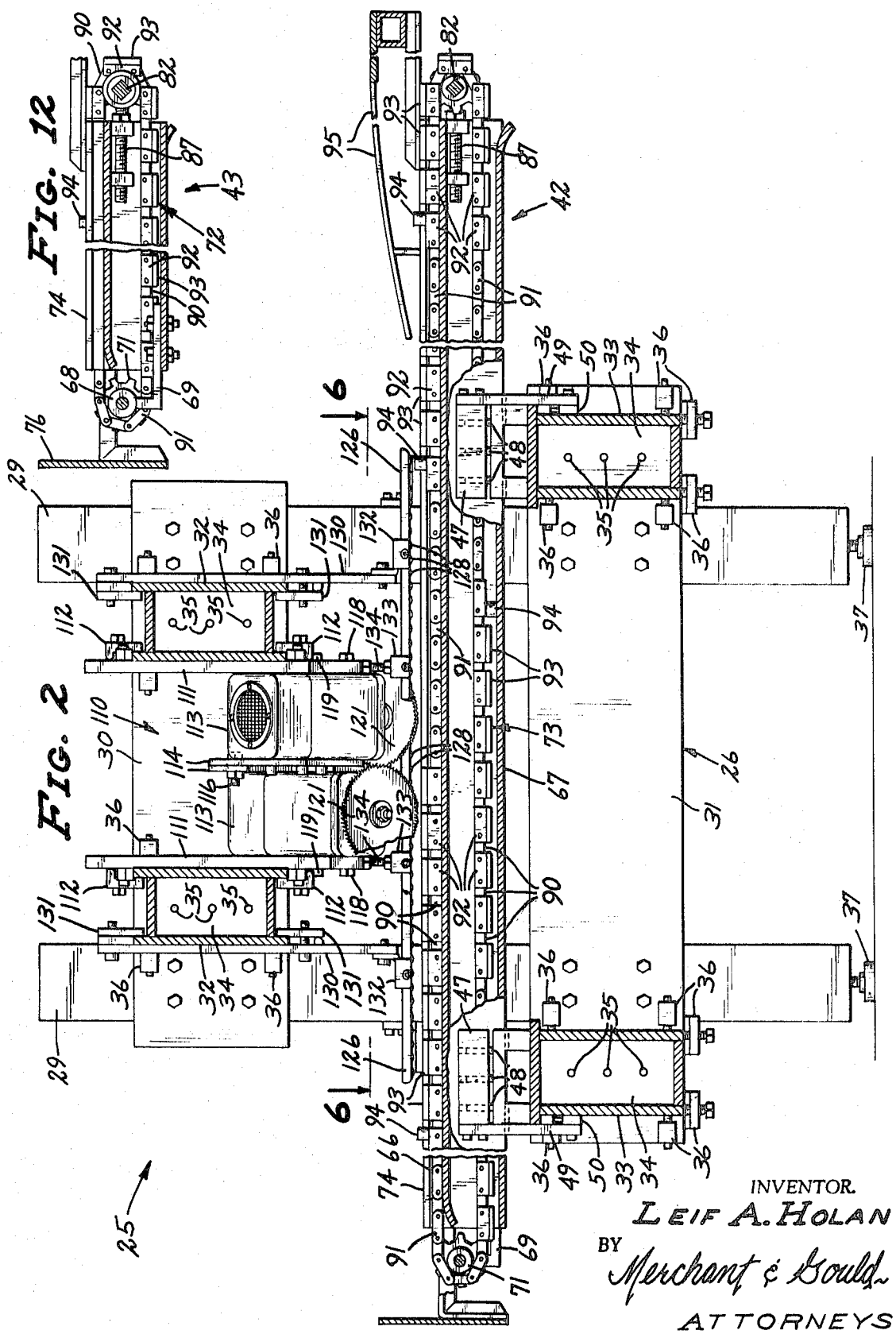

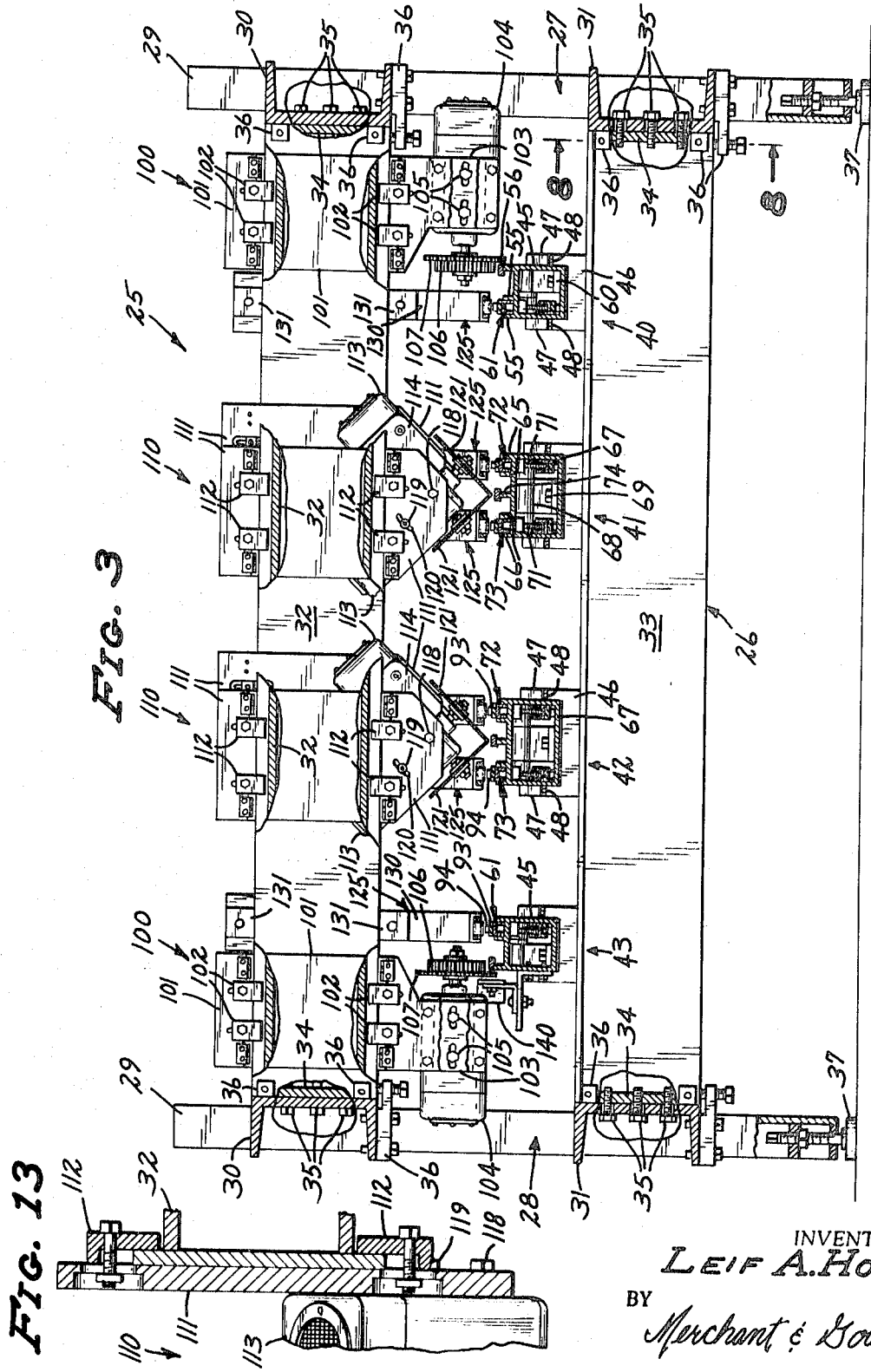

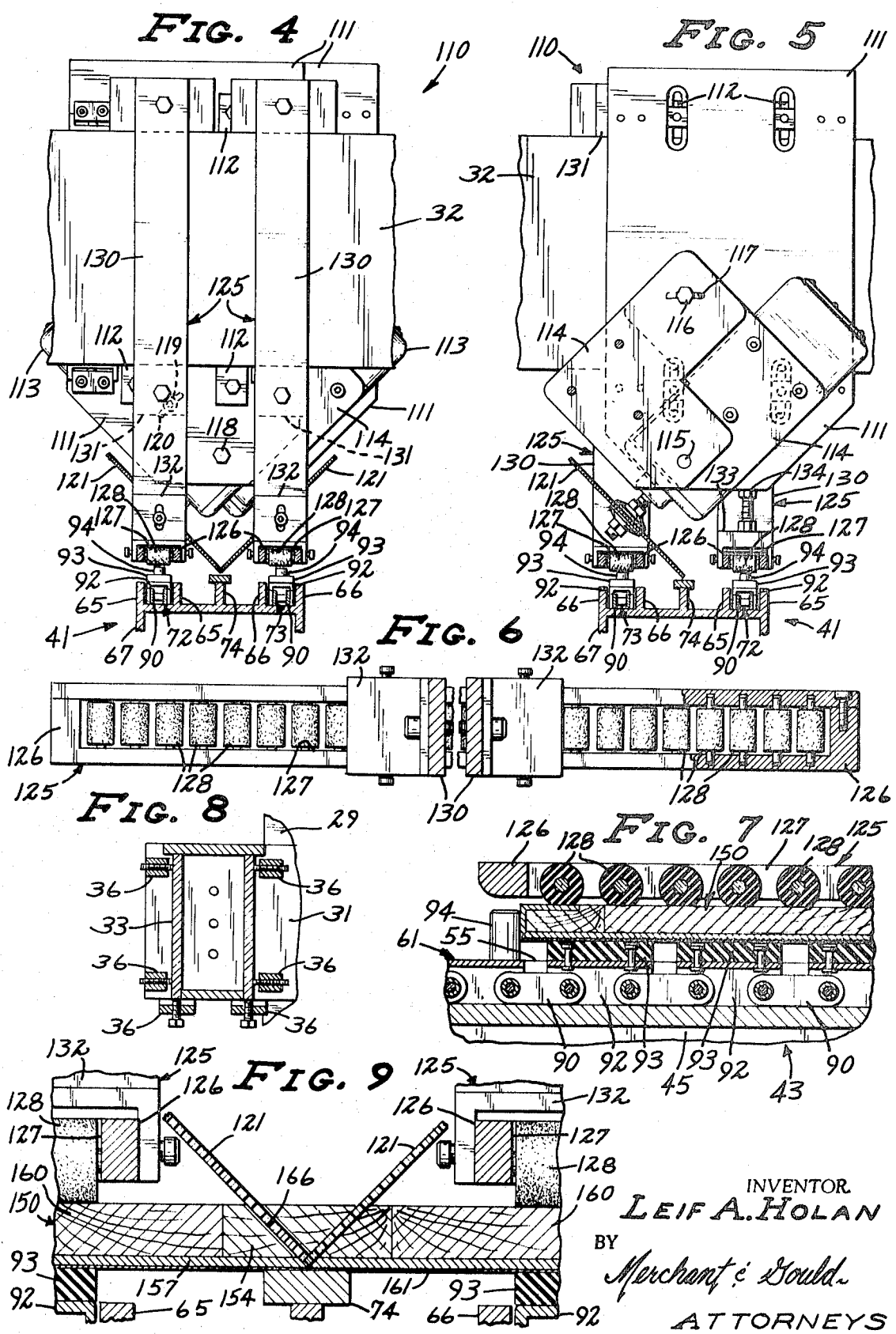

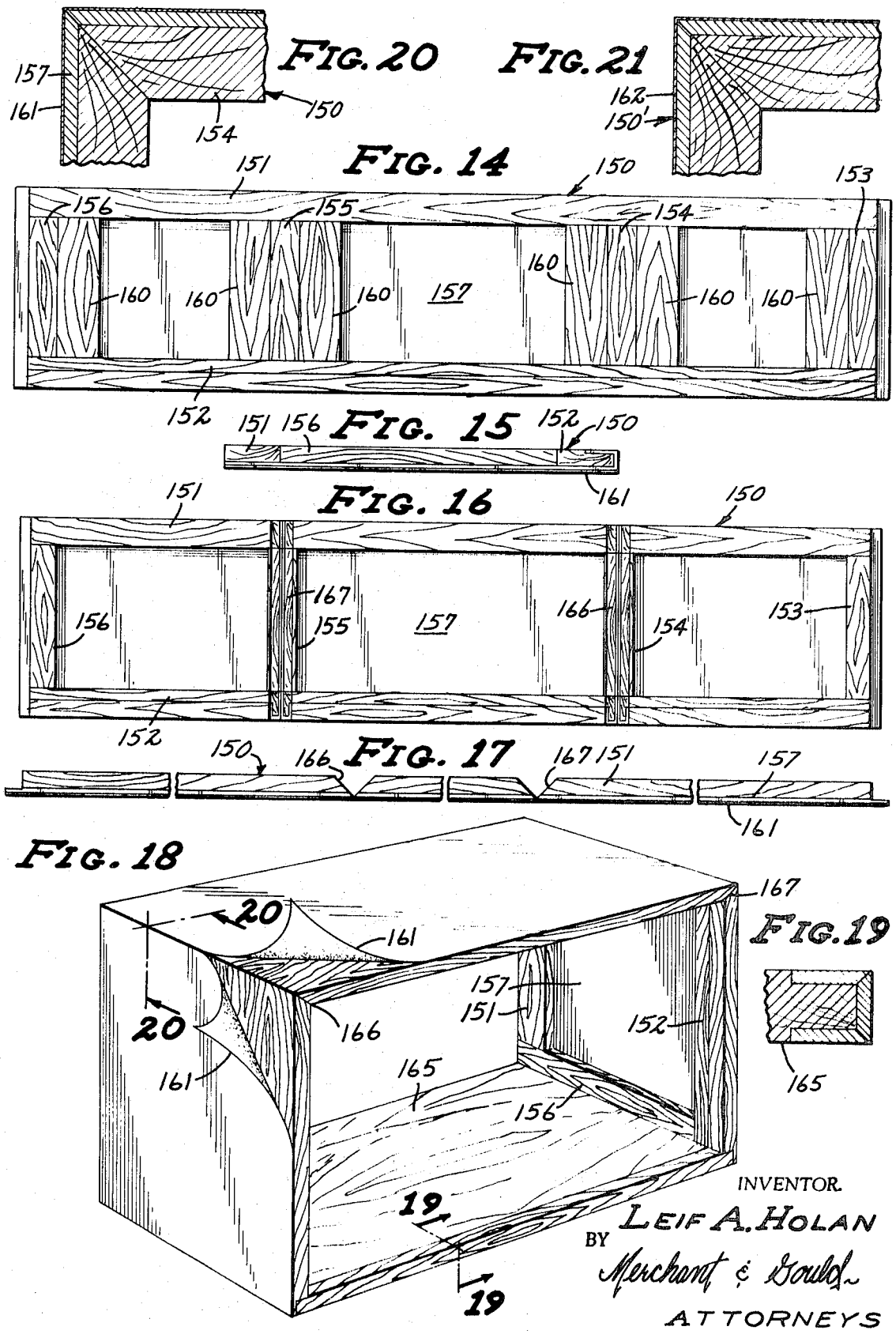

WOODWORKING MACHINE

BACKGROUND OF THE INVENTION

Field of the Invention

In the cabinet-making field, if large quantities of an article are to be produced, it is the present practice to produce the cabinets in the form of an extended panel and cut a plurality of grooves therein for various miter joints. The panel can then be quickly assembled into the desired configuration of the cabinet.

Description of the Prior Art

In the prior art one type of machine utilized to cut grooves for joints, forms an extremely complicated groove through the use of a plurality of working tools, which groove allows formation of a round corner. Since the use of round corners in cabinetmaking is somewhat limited, an additional machine must be utilized to form plain miter joints and the like. A second type of prior art machine utilized to form plain miter joints, forms a groove in a panel with a single rotating tool. This rotating tool is extremely thick and has large teeth therein. Because of the size of the rotating tool there is a great tendency to tear out chunks of material, especially when various pieces of wood, and/or other cabinet materials, are laminated together with the grains thereof crossed or at angles.

SUMMARY OF THE INVENTION

The present invention pertains to a machine for grooving panels including at least a cutting head with first and second rotary cutting elements lying in planes which are disposed at predetermined angles, generally an angle of approximately 45° for a four-sided cabinet, relative to a planar surface of the panel and which intersect each other along a line extending through the panel and spaced inwardly from the planar surface a predetermined distance.

It is an object of the present invention to provide a new and improved machine for grooving panels formed of substantially any wood, combinations of wood, or woodlike material.

It is a further object of the present invention to provide a machine for grooving panels which is completely adjustable.

It is a further object of the present invention to provide a machine for grooving panels which can form a plurality of grooves simultaneously, all of which can be precisely positioned.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 2 is an enlarged view in vertical section as seen from the line 22 of FIG. 1, portions thereof broken away;

FIG. 3 is an enlarged view in vertical section as seen generally from the line 3—3 of FIG. 1, portions thereof broken away and shown in section;

FIG. 4 is an enlarged view in vertical section as seen from the line 4—4 of FIG. 1;

FIG. 5 is an enlarged view in vertical section as seen from the line 5—5 of FIG. 1; FIG. 6 is an enlarged horizontal section of one of the panel holddown members as seen from the line 6—6 of FIG. 2, portions thereof broken away and shown in section;

FIG. 7 is an enlarged detailed view in vertical section as seen from the line 7—7 of FIG. 1, illustrating a panel being transported by the conveyor system beneath a portion of the holddown member;

FIG. FIG. 8 is an enlarged vertical section as seen from portion of line 8—8 in panel in 3;

FIG. 9 is an enlarged fragmentary sectional view of a portion of FIG. 4 illustrating a panel in position with respect thereto;

FIG. 12 is an enlarged sectional view as seen from the line 12—12 of FIG. 1, portions thereof broken away;

FIG. 13 is an enlarged view in vertical section as seen from the line 13—13 of FIG. 1, portions thereof broken away;

FIG. 14 is a plan view of one side of a preformed panel which is adapted to be grooved by the structure of FIG. 1 to form three sides of a cabinet;

FIG. 15 is a view in end elevation of the panel illustrated in FIG. 14;

FIG. 16 is a view similar to FIG. 14 after the panel has been grooved by the structure of FIG. 1;

FIG. 17 is an enlarged view in elevation of one longitudinal edge of the panel of FIG. 16, FIG. 18 is a view in perspective illustrating the panel of FIG. 16 formed into a cabinet with a bottom wall added;

FIG. 19 is an enlarged detailed sectional view as seen from the line 19—19 of FIG. 18;

FIG. 20 is an enlarged detailed sectional view as seen from the line 20—20 of FIG 18;

FIG. 21 is view similar to FIG. 20 illustrating a plastic laminate which replaces the carrier of masking tape illustrated in FIG. 20.

DESCRIPTION OF THE PREFERRED EMBODIMENTS

Figure 1:
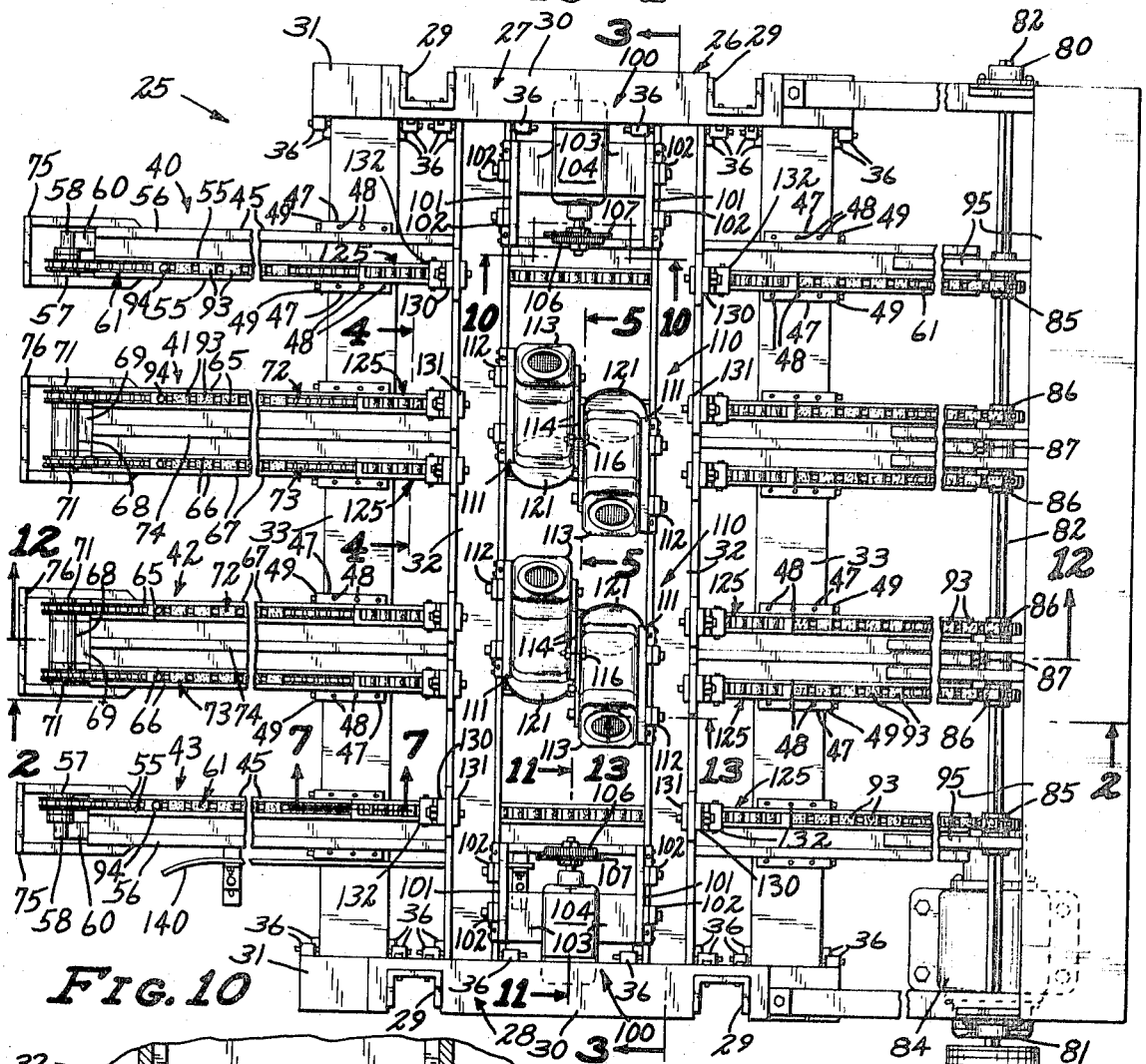
FIG. 1 is a view in top plan of the present woodworking machine, portions thereof broken away.
Figure 10:
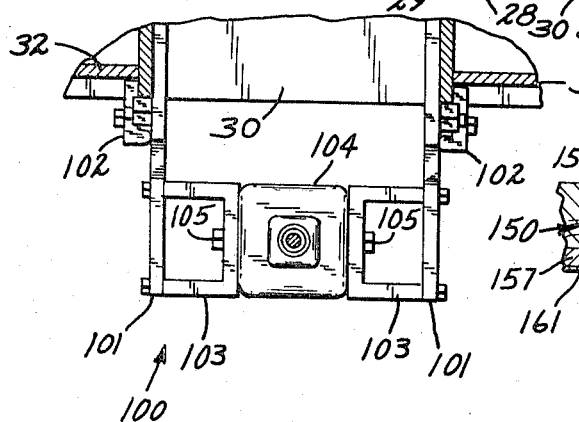
FIG. 10 is an enlarged view in vertical section as seen from the line 10—10 of FIG. 1.
Figure 11:
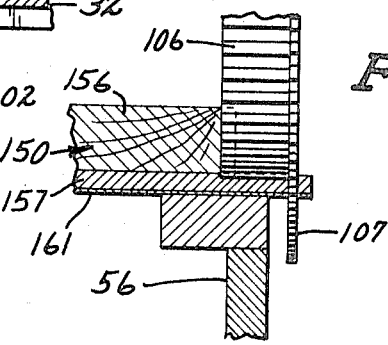
FIG. 11 is an enlarged view in vertical section as seen from the line 11—11 of FIG. 1, portions thereof broken away.

FIGS. 1 through 13 illustrate a woodworking machine, generally designated 25, having a frame 6. The frame 26 includes a pair of end elements 27 and 28 each having a pair of horizontally spaced apart, vertically extending beams 29 with horizontally disposed upper and lower crossbeams 30 and 31, respectively, fixedly attached thereto. The frame 26 further includes a pair of horizontally spaced apart, horizontally extending beams 32 affixed at the ends thereof to the upper crossbeams 30 of the end elements 27 and 28 and a pair of horizontally spaced apart, horizontally extending beams 33 affixed at the ends thereof to the lower crossbeams 31 of the end elements 27 and 28. Each of the beams 32 and each of the beams 33 is an enclosed generally box-shaped beam with a rectangular cross section having a plate 34 fixedly attached at each end thereof by some convenient means such as welding or the like. The plates 34 are positioned in parallel juxtaposition to the inwardly directed webbed portions of the upper crossbeam 30 and the lower crossbeam 31 and a plurality of bolts 35 are threadedly engaged between the beams 30 and 31 and the plates 34 to hold the beams 32 and 33 in the desired position. The bolts 35 pass through relatively large openings (see FIG. 3) in the crossbeams 30 and 31 and are threadedly engaged in the end plates 34 to provide for positioning adjustments of the beams 32 and 33 relative to the end elements 27 and 28. Pairs of ears 36 are affixed to the crossbeams 30 and 31 adjacent either vertical side and the bottom surface of each of the beams 32 and 33 and bolts are threadedly engaged therein so as bear against the surfaces of the beams 32 and 33 and provide horizontal and vertical positioning adjustments therefor. Thus, the beams 32 and 33 are adjusted in position relative to each other and to the end elements 27 and 28 with the use of the bolts in the ears 36 prior to tightening the bolts 35. Also, each of the beams 29 in the end elements 27 and 28 has a vertically adjustable foot 37 threadedly engaged in the bottom thereof to provide for vertical adjustment or leveling of the entire frame 26.

A conveying system for panels includes four conveying units 40-43 supported by, and extending perpendicular to, the beams 33 in a spaced-apart relationship between the end elements 27 and 28. Each of the conveying units 40 and 43 extends approximately beneath a portion of a panel in which a groove for a miter joint is to be formed. The conveying units 40 and 43 are similar and the conveying units 41 and 42 are similar so that only the conveying 40 and 41 will be described at this time.

The conveying unit 40 includes an elongated tubular element 45, having a generally rectangular cross section resting in generally U-shaped slots in the upper surface of a pair of mounting blocks 46, which are in turn positioned between the upper surfaces of the beams 33 and the tubular element 45. A plate 47 is fixedly attached to either side of the tubular element 45 immediately above and parallel with the upper surfaces of the mounting blocks 46 so that the lower surfaces of the plates 47 rest on the upper surfaces of the mounting blocks 46 when the element 45 is resting in the grooves of the mounting blocks 46. A plurality of adjusting screws 48 are threadedly engaged in a generally vertical orientation in the plates 47 so as to abut the upper surfaces of the mounting block 46 and provide vertical adjustments for the conveying unit 40 relative to the mounting blocks 46. A elongated bar 49 is fixedly attached to one end of each of the plates 47 so as to extend downwardly therefrom a short distance beyond the upper surfaces of the beams 33. A horizontally outwardly extending flange is formed integral with the upper surfaces of the beams 33 and an ear 50, having an upwardly directed bolt threadedly engaged therethrough, is affixed to each of the bars 49 below the outwardly extending flange so the bolt therethrough is engaged with the flange to fixedly clamp the conveying unit 40 in the desired orientation. Each of the conveying units 40-43 are attached to the beams 33 in a similar fashion and, consequently, the attaching apparatus is designated by similar numerals.

The element 45 has a pair of upwardly directed, longitudinally extending flanges 55 affixed to the upper surface thereof in a horizontally spaced-apart relationship to form a channel therebetween. A third upwardly directed, generally longitudinally extending flange 56 affixed to the upper surface of the element 45 has a generally inverted L-shaped cross section and provides a supporting surface for panels passing through the woodworking machine. A sprocket 57 is journaled on one end of shaft 58 which is affixed to the lower portion of the element 45 by a bracket 60 so that the sprocket 57 is approximately aligned with the channel between the flanges 55. An endless chain 61 is engaged over the sprocket 57 so that the upper flight thereof lies in the channel between the flanges 55 and the lower flight thereof extends through the opening of the element 45.

The conveying unit 41 is somewhat similar in construction to the conveying unit 40, except that it is a double driving unit with two sets of upwardly directed longitudinally extending flanges 65 and 66 affixed to the upper surface of an elongated tubular element 67. An ear 68 affixed to a bracket 69, which is in turn affixed to the end of the element 67, journals a shaft having a sprocket 71 at each end thereof aligned with the channels between the flanges 65 and 66. Two endless chains 72 and 73 are engaged over the sprockets 71 so that the upper flights are in the channels formed by the flanges 65 and 66, respectively, and the lower flights extend through the opening in the element 67. An upwardly directed, longitudinally extending support flange 74 has a generally T-shaped cross section and is positioned approximately midway between the channels formed by the flanges 65 and 66. Vertically extending guardplates 75 and 76 are affixed to the elements 45 and 67, respectively, in longitudinally spaced relation beyond the sprockets 57 and 71 to reduce the danger to an operator supplying panels to the woodworking machine.

A pair of bearings 80 and 81 are affixed to the end elements 27 and 28 in spaced relation therefrom and have an elongated shaft 82 journaled therein for rotation about an axis perpendicular to and spaced from the ends of the elements 45 and 67 opposite the ends having the sprockets 57 and 71 attached thereto. One end of shaft 82 has a pulley 83 affixed thereto which is driven through a belt-and-pulley arrangement by a motor 84. A sprocket 85 is affixed to the shaft 82 for rotation therewith in engagement with the endless chain 61. A pair of sprockets 86 are affixed to the shaft 82 for rotation therewith in engagement with the endless chains 72 and 73. An elongated tightening bolt 87 (see FIGS. 2 and 12) is threadedly engaged in a pair of ears affixed to the element 67 so as to bear against the shaft 82 and operate to tighten the endless chains 61, 72 and 73. Thus, since all of the endless chains in the conveying units 40-43 are driven from the common shaft 82, they move at the same speed and can be aligned with adjacent chains to move panels through the woodcutting machine in a precisely predetermined orientation.

Each of the endless chains 61, 72 and 73 in the conveying units 40 and 43 are similar so that only the endless chain 73 of the conveying unit 42 (illustrated in FIG. 2) will be described in detail. While the endless chains may be constructed in a variety of configurations, the present chain 73 includes a plurality of links 90 joined periodically by a short series of standard connecting plates 91. Between the periodic short series of links 90, lengths of the endless chain 73, slightly longer than the width of the panels carried thereby, are formed by joining links 90 with special connecting members 92. Connecting members 92 have a generally U-shaped cross section, the two sides or arms of which operate as connecting plates, while the bight forms an outwardly directed, flat surface. A resilient pad 93, formed of rubber or the like, is affixed to the outwardly directed surface of each of the connecting members 92 and cooperates with adjacent resilient pads 93 to provide panel support means. The thickness of the resilient pads 93 is sufficient to bring the upper surface thereof approximately into a plane with the upper surfaces of the support flanges 56 and 74 previously described. The last connecting member 92 in a series thereof does not have a resilient pad 93 attached thereto but instead has an upwardly projecting reference stop 94 fixedly attached thereto. The reference stops 94 in all of the endless chains 61, 72 and 73 are aligned transversely and abut the trailing edge of a panel positioned on the series of resilient pads 93 to urge the panel through the woodworking machine in the correct orientation. A ramp member 95 is affixed to the conveying unit 40-43 adjacent each of the endless chains 61, 72 and 73 for receiving finished panels thereon. The reference stops 94 urge the finished panels up the ramp member 95 where they can be removed and stacked for further operations.

Each of the conveying units 40 and 43 have a cutting head generally designated 100 associated therewith. The cutting head 100 includes a pair of mounting plates 101 each adjustably affixed to an inwardly directed surface of a beam 32 in generally opposed relationship by means of four clamps or dogs 102 which are bolted to the plates 101 and engaged over upwardly and downwardly extending flanges of the beams 32. The plates 101 extend downwardly below the beams 32 a substantial distance and have two inwardly extending spacer members 103 affixed thereto adjacent the lower ends (see FIG. 10). A rotary-type electric motor 104 is mounted between the spacer members 103 with the shaft thereof generally horizontal and directed inwardly away from the end element 27. A plurality of bolts 105 extending through slots in the spacer members 103 into the housing of the motor 104 adjustably mount the motor 104 (see FIG. 3) for limited horizontal movements.

The motor 104 has attached to the shaft thereof in coaxial juxtaposition a router-type cutting element 106 and a circular saw 107 having a somewhat greater diameter than the cutting element 106. The cutting element 106 is affixed to the shaft so as to generally overlie the support flange 56 of the conveying unit 40 and the circular saw 107 adjacent thereto extends downwardly slightly beyond the flange 56. The cutting element 106 is positioned to form a groove for a rabbet joint in a panel passing through the machine while the circular saw trims the edge of the panel at the desired location. Adjustments of the entire cutting head 100 in a vertical and/or horizontal direction and adjustment of motor 104 by means of the bolts 105 correctly position the cutting element 106 and circular saw 107 to correctly position and determine the depth and width of the groove for the rabbet joint as well as the edge of the panel.

A second type of cutting head generally designated 110 is associated with the each of the conveying units 41 and 42. The cutting heads 110 each include a pair of mounting plates 111 adjustably affixed to the inwardly directed surfaces of the beams 32 in opposed but slightly staggered relationship (see FIG. 1) by means of four clamps or dogs 112 affixed to each of the plates 111 by bolts and engaged over the upwardly and downwardly extending flanges on the beams 32. A pair of rotary-type electric motors 113 each have an L-shaped mounting plate 114 affixed thereto so that one arm of the plate extends parallel with the shaft of the motor 113 and one arm extends perpendicular thereto. The plates 114 are positioned in parallel juxtaposition with the motors 113 extending outwardly therefrom on both sides and the shafts of the motors 113 lying in generally perpendicular planes but spaced apart horizontally. The plates 114 are pivotally attached adjacent the ends of the parallel arms thereof by means of a pin 115 (see FIG. 5) and are affixed for limited rotational adjustment about the pin 115 by means of a bolt 116 engaged through arcuate slots 117 adjacent the ends or the perpendicular arms of each of the plates 114. Thus, loosening the bolts 116 and rotating the plates 114 relative to each other about the pin 115 varies the angle between the planes through the shafts of the motors 113.

The assembly of the two motors 113 and the two plates 114 therebetween is adjustably mounted between the two mounting plates 111 by means of first bolts 118 extending through openings in the plates 111 and threadedly engaged in the housings of the motors 113 coaxial with the pin 115 and second bolts 119 each extending through on arcuate slot 120 in the plates 111, spaced longitudinally along the motor 113 from the bolt 118, and threadedly engaged in the housing of the motor 113. The arcuate slots 120 and the previously described arcuate slots 117 are concentric with the axis of the pin 115 and the bolts 118 so that the motors 113 can be rotated about the axis.

The shafts of each of the motors 113 have a circular saw 121 attached thereto. Circular saws 121 lie in planes approximately perpendicular to each other positioned to converge downwardly at a line spaced a predetermined distance above the support flange 74. The distance above the flange 74 of the line along which the planes of the circular saws 121 converge is variable and depends upon the material in the particular panel being grooved. In general, this distance will be approximately the thickness of an outer bendable layer of material or an outer layer of protective material, such as masking tape or the like.

The angular position of the circular saw blades 121 relative to each other can be adjusted by loosening the bolt 116 and the bolts 118 and 119 in each of the motors 113. Also, the entire motor assembly can be adjusted by simply loosening the bolts 118 and 119 in the motors 113, assuming that the blades 121 are in the desired angular relationship relative to each other. Referring especially to FIG. 5, it can be seen that the dogs 112 are affixed in slots in the plates 111 so that the entire cutting head 110 is adjustable vertically. Thus, the cutting heads 110 can be adjusted horizontally and vertically with respect to the beams 32 to place them at substantially and position relative to a panel and the circular saws 121 can be adjusted relative to each other and to the entire assembly.

Each of the endless chains 61, 72 and 73 associated with the conveying units 40–43 has holddown means generally designated 125 mounted thereabove. The holddown means 125 is adapted to bear against the upper surface of a panel passing through the woodworking machine and maintain it tightly engaged with the upper surface of the resilient pads 93 and the reference stops 94 at the ends thereof. The holddown means 125 (see FIGS. 2, 6, 7 and 9) includes an elongated frame 126 with an elongated, slotlike opening 127 extending from adjacent one end thereof to adjacent the other end thereof. A plurality of resilient rollers 128, formed of rubber or the like, are mounted in parallel generally uniformly spaced-apart relationship within the opening 127 so that the axes thereof are perpendicular to the longitudinal axis of the opening 127 and the lower surface of the rollers 128 extend somewhat below the lower surface of the frame 126 (see FIGS. 6 and 7).

Each of the frames 126 is adjustably positioned above an endless chain 61, 72 and 73 in the following manner. At least two elongated bars 130 are affixed to the outwardly directed surfaces of the beams 32 by means of two adjustable dogs 131 bolted to each of the bars 130 and engaged over upwardly and downwardly extending flanges of the beams 32. The frames 126 are attached to the bars 130 by means of a clamping or footlike member 131. A clamping member 132 is affixed to the lower end of each of the bars 130 by means of a bolt passing through a vertical slot in a vertical platelike portion thereof and threadedly engaged into the bar 130. The clamping member 132 has a generally horizontal portion with a downwardly opening groove therein which overlies and extends downwardly along either side of the frame 126. Set screws are threadedly engaged through the horizontal portion of the clamping member 132 and abut against the sides of the frame 126 to hold the frame 126 fixedly in position in the clamping member 132.

In the present embodiment, the holddown means 125 above the endless chains 72 and 73 of the conveying units 41 and 42 each have an additional clamping member 133 affixed thereto below each one of the plates 111. This additional clamping member 133 is somewhat similar to the clamping member 132, except that a vertically adjustable bolt 134 is threadedly engaged in the upper surface thereof so as to butt against the lowermost edge of the plate 111 and aid in preventing the frame 126 from bowing upwardly. Thus, once a panel is engaged between the resilient pads 93 of the endless chains 61, 72 and 73 of the conveying units 40–43 and the holddown means 125 thereabove, vertical or other transverse movement is prevented. A guide 140 is affixed to the element 45 of the conveying unit 43 so as to butt against the outermost edge of a panel being inserted in the woodworking machine and position it along the transverse axis of the conveying units 40–43 until it is engaged sufficiently beneath the holding means 125.

A typical panel generally designated 150 adapted to be grooved by the above-described woodworking machine is illustrated in FIGS. 14–20 with an illustration of a slightly different embodiment thereof in FIG. 21. The panel 150 includes a frame having two stringers 151 and 152 extending substantially the length thereof along the longitudinal edges and four braces 153 through 156 extending therebetween and spaced apart horizontally. A sheet of covering material 157 is affixed over one side of the frame so as to extend outwardly beyond both ends of the stringers 151 and 152 a short distance and the material 157 is laminated onto the outermost edge and a portion of the opposite surface of the stringer 152 (see especially FIG. 15). A plurality of additional temporary braces 160 are positioned adjacent the braces 153–156 between the stringers 151 and 152 to provide surfaces for the holddown means 125 to engage. In the embodiment illustrated in FIGS. 14 through 20, a coating of flexible protective material 161, such as masking tape or the like, is applied to the outer surface (opposite the frame) of the covering material 157 to prevent marring the outer or finished surface of the covering material 157. In the embodiment 150' illustrated in FIG. 21, a hard layer of finishing material 162, such as high-pressure laminated plastic sheets of melamine and phenolic impregnated materials sold under the trademark "Formica," is permanently affixed to the outer surface of the covering material 156 and does not require a special protective material thereover.

In the operation of the woodworking machine, a panel 150 is placed on the upper surfaces of adjacent lengths of resilient pads 93 so that the stringer 151 butts against the reference stops 94 and the outermost edges adjacent the braces 153 and 156 butts against the guide 140 to transversely align the panel 150. The conveying units 40–43 move the panel 150 under the holddown means 125 and, subsequently, under the two cutting heads 100 and the two cutting heads 110. The cutting heads 100 at each end of the panel 150 face or finish the ends of the stringers 151 and 152, the outermost edges of the braces 153 and 156, and the upwardly directed surface of the covering material 157 adjacent thereto as well as cutting or edging the covering material 157 at the desired position (see especially FIG. 11). The grooves at the ends of the panel 150 formed by the cutting heads 100 later cooperate with the ends of a bottom panel 165 (see FIG. 18) to form rabbet joints therewith. The cutting heads 110 cut V-shaped grooves 166 and 167 through the stringer 151, braces 154 and 155, and the stringer 152. The distance between the lowermost edges of the circular saw blades 121 of the cutting heads 110 and the upwardly extending support flanges 74 is set so that it is approximately equal to the protective material 161 (or the outer coating 162 in the second embodiment). Thus, the panel 150 can be bent at the grooves 156 and 157 to form plain miter joints thereof. Once the joints of the panel 150 and the panel 165 are fixedly formed and any other operations are performed thereon, the protective material 161 can be removed.

Thus, the present woodworking machine can be set up to accurately and efficiently form one or a plurality of joints in cabinets and the like. Because of the manner in which the panels are held as they are being cut and because of the extremely accurate adjustments provided for the various parts of the machine, the accuracy of the machine is greatly improved over prior art devices and methods. Further, because circular saw blades, which are relatively thin and have relatively small teeth, are utilized to form the V-shaped notches of the miter joint, damaged and rejected panels are greatly reduced if not eliminated. It should be understood that while a preferred embodiment of the present woodworking machine has been illustrated, many alterations and innovations may be devised by those skilled in the art.

What is claimed is:

1. A machine for grooving panels having side edges, end edges, and planar surfaces, the machine comprising:
    a. frame means including a pair of spaced vertically disposed end frame elements, a first pair of laterally spaced elongated support beams extending between said end frame elements and a second pair of laterally spaced elongated support beams extending between said end frame elements in vertically spaced relationship to said first pair of support beams, and means for adjustably mounting said first and second pairs of support beams to said end frame elements for vertical adjustments in which each of said end frame elements includes means for adjusting same vertically relative to a supporting surface;
    b. panel support means carried by said first pair of support beams of said frame means for supporting said panel on said support means in a generally horizontal plane, said panel support means including a plurality of elongated rail elements mounted on said first pair of support beams of said frame means and extending in a direction generally parallel with the desired direction of the grooves, said rail elements defining panel-supporting upper surfaces which lie in a common plane, conveyor means including a plurality of conveyors at least one each of which is mounted on each of said rail elements to convey a panel supported on said upper surfaces of said rail elements longitudinally thereof from a feed portion of said panel support means to a receiving portion thereof, and means for simultaneously driving each of said conveyors;
    c. groove-forming means adjustably mounted on said second pair of support beams of said frame means in overlying relationship to said panel support means and having at least a cutting head with first and second rotary cutting elements continuously, angularly adjustable relative to each other and said frame means over a predetermined range;
    d. power means adapted to impart rotation to said cutting elements;
    e. said first and second cutting elements lying in planes which are disposed at predetermined angles relative to said horizontal plane and which intersect each other at a predetermined point above a rail element of said support means;
    f. means for moving one of said panel and groove-forming means relative to the other of said panel and groove-forming means whereby to cut a groove in one of the planar surfaces of said panel; and
    g. holddown means engageable with the side opposite said planar surface maintaining said panel in engagement with said panel-supporting means during said relative movement of said panel and groove-forming means.

2. The structure of claim 1 in which said plurality of cutting heads include a first pair of cutting heads positioned on said second pair of support beams to cut a pair of plain miter grooves transversely of said panel at predetermined points thereon between the opposite side edges thereof as it passes therebeneath and a second pair of cutting heads and adapted to trim and form a rabbeted miter joint along opposite end edges of said panel between the opposite side edges thereof.

3. The structure of claim 1 wherein the first and second rotary cutting elements of the cutting head are each driven by a motor having a first mounting plate fixedly attached to one side and a second mounting plate adjustably attached to a second side so as to be parallel and spaced from said first mounting plate, said first mounting plates being adjustably attached together in parallel juxtaposition so that said cutting elements lie in planes disposed at approximately 90° to each other and are adjustably rotatable about a common axis, and said second mounting plates being individually and simultaneously adjustable about the common axis to alter the relative angles of the cutting elements and the angle of the cutting head relative to the panel support means.

4. A machine for grooving panels having side edges, end edges, and planar surfaces, the machine comprising;
    a. frame means;
    b. panel support means carried by said frame means for supporting said panel on said support means in a generally horizontal plane;
    c. groove-forming means carried by said frame means in overlying relationship to said panel support means and having at least a cutting head with first and second rotary cutting elements, said first and second rotary cutting elements of the cutting head each being driven by a motor having a first mounting plate fixedly attached to one side and a second mounting plate adjustably attached to a second side so as to be parallel and spaced from said first mounting plate, said first mounting plates being adjustably attached together in parallel juxtaposition so that said cutting elements lie in planes disposed at approximately 90° to each other and are adjustably rotatable about a common axis, and said second mounting plates being individually and simultaneously adjustable through a continuous range about the common axis to alter the relative angles of the cutting elements and the angle of the cutting head relative to the panel support means;
    d. said first and second cutting elements lying in planes which are disposed at predetermined angles relative to said horizontal plane and which intersect each other at a predetermined point above said support means;
    e. means for moving one of said panel and groove-forming means relative to the other of said panel and groove-forming means whereby to cut a groove in one of the planar surfaces of said panel; and
    f. holddown means engageable with the side opposite said planar surface maintaining said panel in engagement with said panel-supporting means during said relative movement of said panel and groove-forming means.

* * * * *